United States Patent [19]
Ilic

[11] Patent Number: 4,981,215
[45] Date of Patent: Jan. 1, 1991

[54] FLEXIBLE DEVICE FOR PACKING OR SUPPORT

[76] Inventor: Zoran Ilic, 5 rue Salvador Alende, F69600 Oullins, France

[21] Appl. No.: 362,801

[22] Filed: Jun. 7, 1989

[30] Foreign Application Priority Data

Jun. 8, 1988 [FR] France ............................. 88 07884

[51] Int. Cl.⁵ ........................................... B65D 81/04
[52] U.S. Cl. ................................. 206/521; 206/320; 248/624; 267/136
[58] Field of Search ............... 206/319, 320, 521, 586, 206/591; 248/564, 581, 585, 618, 624; 267/1.5, 80, 103–105, 136, 137, 139, 140.1

[56] References Cited

U.S. PATENT DOCUMENTS

| | | | |
|---|---|---|---|
| 1,769,434 | 7/1930 | Jones | 248/624 |
| 2,968,818 | 1/1961 | Petersen | 248/624 |
| 3,741,512 | 6/1973 | Olsson | 248/585 |
| 3,774,711 | 11/1973 | Lacey | 248/624 |
| 4,365,770 | 12/1982 | Mard et al. | 267/136 |

FOREIGN PATENT DOCUMENTS 0704410 2/1965 Canada ............................. 267/136

*Primary Examiner*—Jimmy G. Foster
*Attorney, Agent, or Firm*—Browdy and Neimark

[57] ABSTRACT

An elastic packing or support device that can be used especially for the elastic support and/or packing of objects during transportation. The device includes at least one elastic element composed of two mobile and parallel plates with repulsion springs and orthogonal guide mechanisms having hinged plates which, while allowing main plates to move apart and together, substantially prevent them from making any relative lateral movements.

15 Claims, 5 Drawing Sheets

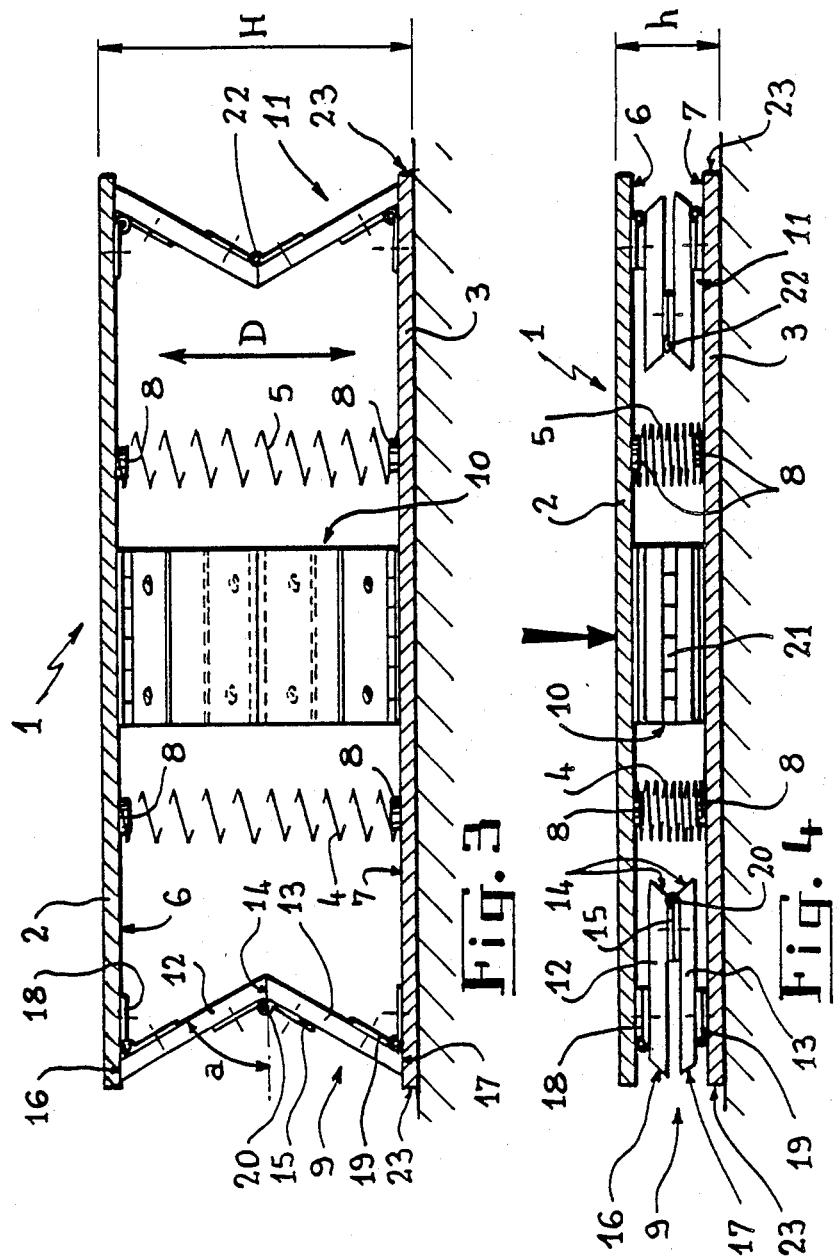

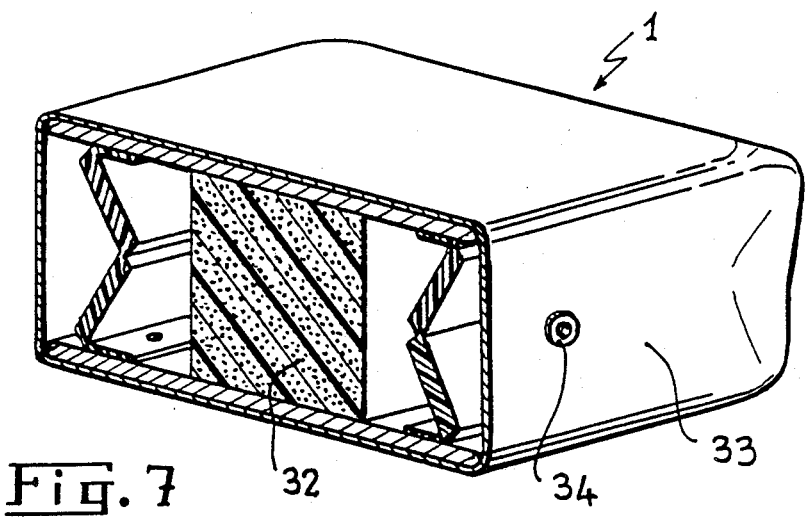
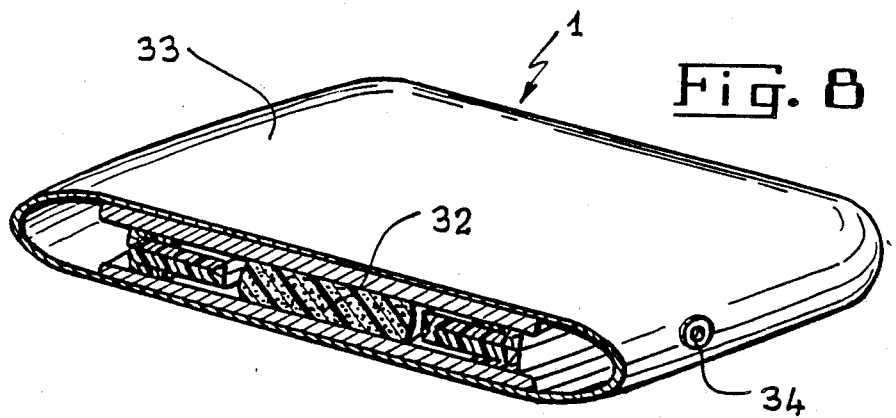
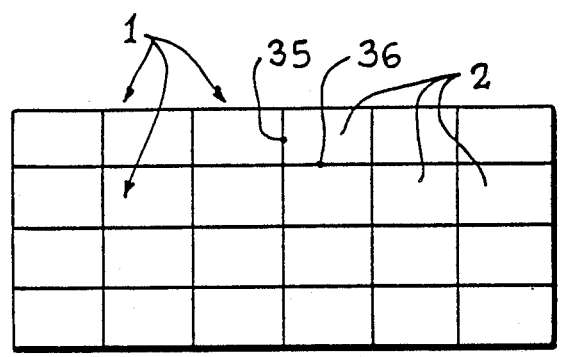

FLEXIBLE DEVICE FOR PACKING OR SUPPORT

BACKGROUND OF THE INVENTION

1. Field of the Invention

This invention pertains to a flexible device for packing or support that can be used in a wide variety of applications, especially for flexible packing or support of objects during transport.

2. The Prior Art

The problem of packing objects, especially fragile ones, in a vehicle compartment, container, transport car, etc., has not yet been solved in a satisfactory manner, and in any event not in a sufficiently convenient, effective, inexpensive and universal way.

Thus, to pack objects in an automobile trunk, for example, mechanical packing means are provided in document FR-A-2,518,469, which, if they have the advantage of being adjustable, present the inconvenience of requiring attachment to the automobile trunk, which calls for punched holes and bolt fastening, operations complex and specialized enough so as not to be appropriate for all cases.

In the same line of thought, the practice is known of packing fragile units such as televisions in their packing cases using blocks made of polystyrene or similar materials especially for this purpose. This is a restrictive solution because it requires the design of a specific packing set for each unit; furthermore, the elasticity of the packing materials used can sometimes be considered insufficient for certain applications.

The pure and simple use of flexible foam to pack objects in a compartment for packaging or transport is not sufficiently effective, the packing thus obtained thus being inadequate because it does not prevent the object from moving in all directions, and such erratic movements may end up damaging the object, especially due to vibrations generated during transport, particularly by rail or road.

In the totally-unrelated field of bedding, in the area of elastically flexible mattresses, there are either mattresses made of natural or artificial foam, or "spring" mattresses. These mattresses have the disadvantage not only of being likely to move elastically in the orthogonal direction to the plane of the mattress, i.e., vertically, which is the desired effect, but also of being capable of appreciable lateral movement, i.e., horizontal, which is undesirable for users.

The exact same thing applies for known flexible carpets, which, in addition to the particularly desirable vertical elasticity in terms of comfort for the users who walk on them, also have horizontal elasticity that is undesirable and even dangerous.

SUMMARY OF THE INVENTION

The invention aims to correct these problems. For this purpose, it pertains to a packing or support device composed of at least one flexible component, said component comprising two surfaces placed opposite each other, said two surfaces being mobile with respect to each other, composed of a rigid or semi-rigid material and able to move apart or together elastically under the action of the elastic repulsion means provided for this purpose in the space between them. Mechanical guide means are also provided between the two mobile surfaces to counter any substantial relative lateral movement of said surfaces. Said mechanical guide mechanisms are composed of a set of at least two guide components substantially orthogonal to each other, each of said components itself being composed of at least two rigid plates, hinged together on a common side, each also being hinged respectively to one of the two aforementioned opposite mobile surfaces by their sides respectively parallel and opposite the aforementioned side on which these two plates hinge together.

BRIEF DESCRIPTION OF THE DRAWINGS

In any event, the invention will be clearly understood and its advantages and other features will emerge from the description below of a few non-restrictive sample embodiments with reference to the attached schematic drawings, wherein:

FIG. 3 shows this element in a cross section along III—III in FIG. 2 and placed on the ground;

FIG. 4 is a view similar to that in FIG. 3, with this element crushed at the maximum level;

FIG. 7 is a perspective view with a transverse cut of a portion of the packing for an automobile trunk constituting a specific variation of the element according to FIGS. 1 to 4;

FIG. 8 shows the packing in FIG. 7 crushed at the maximum level; and

FIG. 9 is a simplified top view of a mattress or carpet made using a checkerboard arrangement of flexible elements according to the invention.

DETAILED DESCRIPTION OF THE PREFERRED EMBODIMENTS

Figure 1:
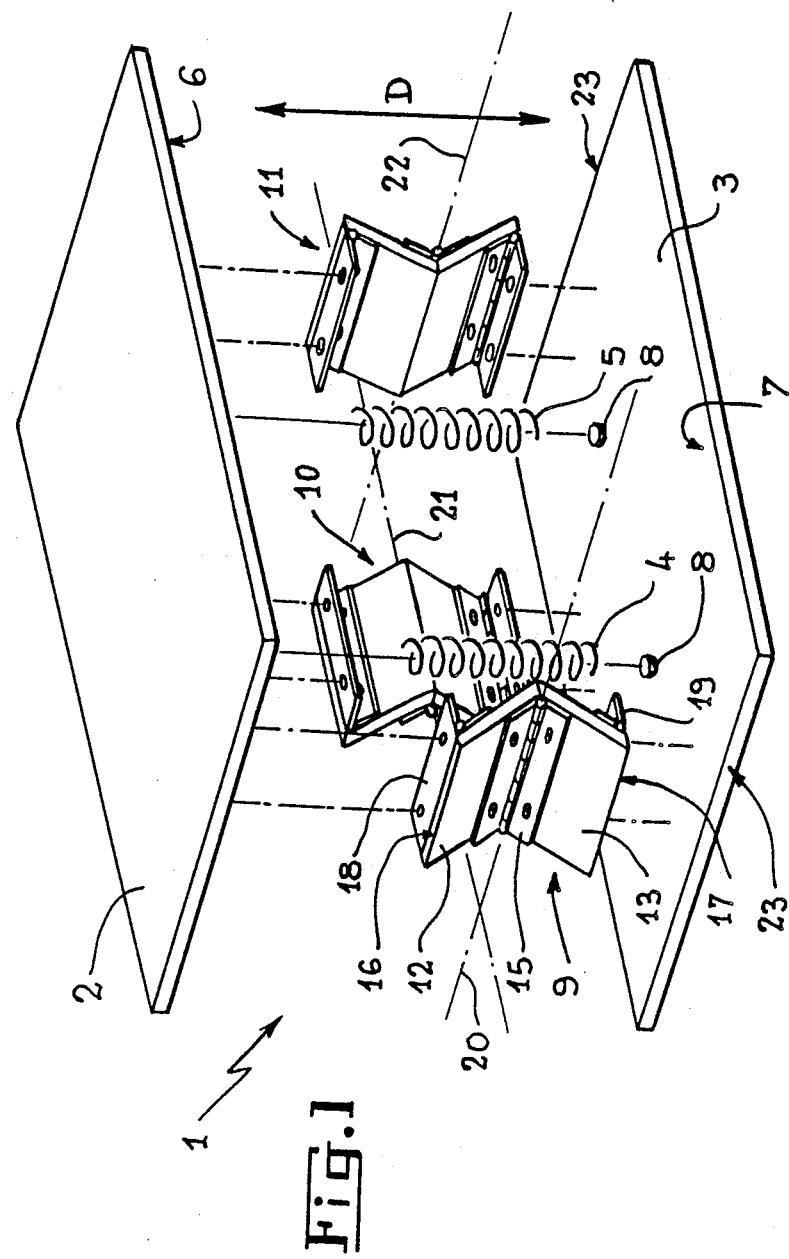
FIG. 1 is a perspective blow-up view of a flexible packing or support device.
Figure 2:
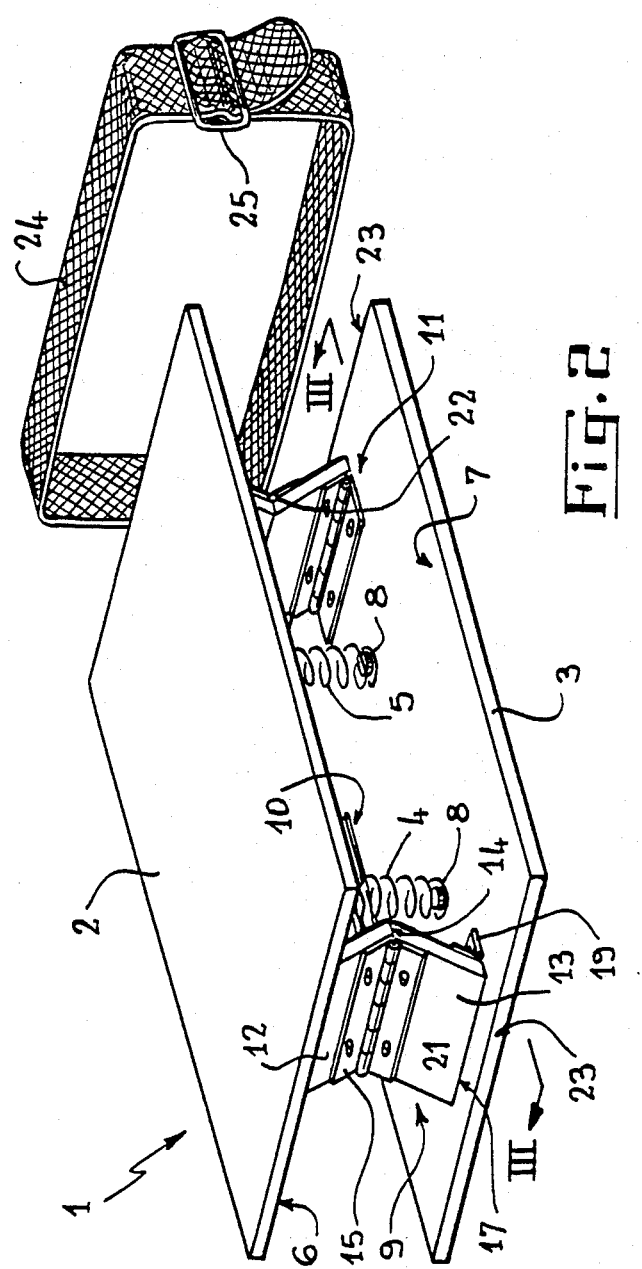
FIG. 2 shows the same element fully mounted, with an additional prestressing accessory shown separately.

First of all, with reference to FIGS. 1 to 4, said elastic packing or support element 1 has the general aspect of a parallelopiped rectangle and is composed of the following elements.

Two rigid rectangular plates 2, 3 are disposed opposite and parallel to each other and are made of, for example, a plastic material. Two helicoidal elastic repulsion springs 4, 5 press against the opposite surfaces 6, 7 of plates 2, 3, and are held perpendicular thereto by projections or teats 8, which keep said plates apart. Three hinged guide components 9, 10, 11, to be described below, perform the role of preventing any substantial relative lateral movement of plates 2, 3 with respect to each other, and thus preventing virtually any spring movement thereof in the orthogonal direction to their plane, within limited transverse mechanical clearances.

Each of said three guide components, for example, component 9, is composed of two rigid rectangular plates 12, 13, hinged together along a common side 14 by a mounted hinge 15. It must be noted that, along the common side 14, plates 12, 13 are cut on the bias, i.e., at an angle "a" that is under 90 degrees, in order to limit the total opening of component 9 to a value under 180°, by pressing on its conjugate sides (see FIG. 3).

Likewise, sides 16, 17 of small plates 12, 13, which are parallel and thus opposite common side 14, are hinged to inside surfaces 6, 7 of plates 2, 3 by means of mounted hinges 18, 19.

Hinging axes 20 and 21 of guide components 9 and 10 are substantially orthogonal to one another, and said orthogonal nature opposes any substantial lateral movements of plates 2 and 3 with respect to each other, within limited mechanical clearances. The plates can move elastically against the repulsive force of springs 4, 5 only by moving together or apart in direction D orthogonal to their plane. In the absence of crushing by an outside force in direction D, the two plates 2 and 3 are parallel and separated by a maximum spread of H (FIG. 3), while, in the event of maximum crushing (FIG. 4) they are separated by minimum spread h, caused by the maximum possible flattening of guide components 9 to 11.

It must be noted that hinge axis 22 of third guide component 11 is parallel to hinge axis 20 of guide component 9, and thus it also is perpendicular to the hinge axis 21 of second component 10. The third guide component 11 which, like component 9, has a hinge axis 22 parallel to the short side 23 of the rectangle formed by each of the main plates 2 and 3, substantially serves to ensure the proper mechanical tolerance of the unit.

A device, adjustable or otherwise, can advantageously be attached to the elastic packing or support element according to FIGS. 1 to 4, in order to limit the distance between said main plates 2 and 3 to a spread less than the aforementioned maximum value H. As a non-restrictive example of a device to limit the spread, a removable strap 24 was drawn in FIG. 2, whose length can be adjusted by sliding in a conventional adjustment and fastening buckle 25: by tightening or loosening the strap 24 after placing it around elastic packing 1, the latter can easily be crushed to a greater or lesser extent by creating prestressing in this manner to give it the desired spread distance (i.e., the thickness) which is between H and h. It must be noted that, for the packaging and transport of packing 1, it will be advantageous to tighten the strap 24 to the maximum level, to give the packing 1 the minimum volume by crushing it as much as possible in the position in FIG. 4.

Figure 5:
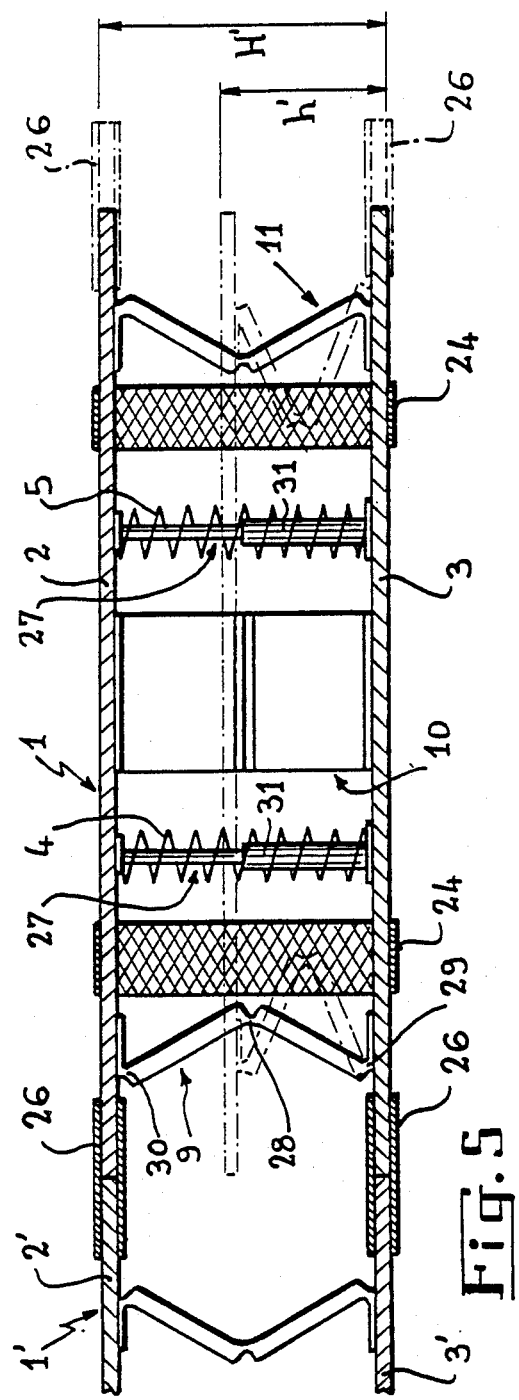
FIG. 5 shows a variation of the element in FIGS. 1 to 4 in the same manner, with prestressing means and mechanisms for attachment to other identical elements.
Figure 6:
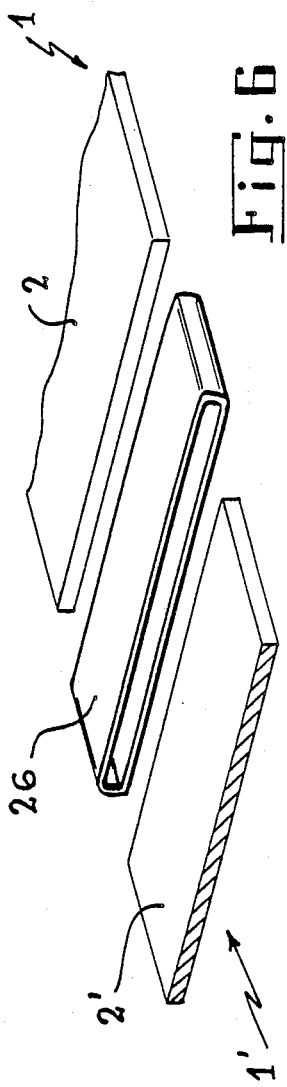
FIG. 6 is a perspective view of a coupling component appearing in FIG. 5.

Now, with reference to FIGS. 5 and 6, this is an elastic packing or support device comprising several elements 1', 1, . . . , assembled end-to-end using sliding assembly sleeves 26 that can surround two upper plates, 2, 2', or lower plates 3, 3', of two adjacent elements 1, 1', thus connecting them end-to-end.

On an illustrative basis, straps 24 are provided on this device in order to limit the space between plates 2, 3 to a prestressing value of H'.

Moreover, shock absorbing jacks 27 are provided between plates 2, 3, perpendicular thereto, to absorb shocks from the compression of the device.

Finally, still to illustrate the possible variations, components 9, 10, 11 are each composed of a single piece of rigid plastic material with crush lines 28, 29, 30 producing the desired hinge effects.

It must be noted that, because of shock absorbing jacks 27, maximum crushing is limited to a height h' required by the length of the body 31 of the jacks.

FIGS. 7 and 8 show a packing 1 for "general public use," designed especially to pack various objects and baggage in an automobile trunk.

The packing is different from that in FIG. 5 in that, since its design is highly simplified for obvious reasons of cost reduction, it has no shock absorbing jacks, and in that helicoidal springs 4, 5 are replaced by a simple packing 32 made of flexible foam or similar elastic product such as an elastomer.

Moreover, the packing 1 is fully enclosed in a flexible cover 33, having air entry openings 34, which is preferably at least partially made of a material with a skid-resistant outside surface.

The cover 33 also serves to limit the thickness of the packing under no charge (FIG. 7). FIG. 8 shows this packing in maximum crushed position.

The uses of the flexible packing or support elements 1 are highly varied and, for example, it is possible to make a checkerboard arrangement as shown in FIG. 9 of elements 1 assembled for example by the sides 35, 36 of each of their aforementioned upper plates 2 (or, more advantageously, their lower plates 3), in order to make either a mattress (a beach mattress or the center of a spring mattress) or flexible carpet, depending on the size and number of elements 1.

Of course, the invention is not limited to the example embodiments just described; on the contrary, it can be made in numerous other embodiments. Thus, for example, opposite surfaces 2, 3 could have a semi-shell form or another shape besides flat. These surfaces could also be other than parallel, which could be advantageous for packing small suitcases or gas bottles, for example, in an automobile trunk. They can be placed on the outside or covered fully or partially with a skid-resistant material. They can be semi-rigid instead of rigid. The guide components may be limited to only two orthogonal components such as 9 and 10. On the contrary, there can be more than three of them. Hinges 15, 18, 19 could be spring hinges, which could in certain cases make it possible to dispense with springs 4, 5 or the foam lock 32. The elastic repulsion mechanism can be composed of an inflatable pneumatic device. Each guide component can be composed of three hinged plates instead of two, or even more than three hinged plates. Each packing device, for example, according to FIGS. 7 and 8, could be at least partially covered with a fluorescent material so that it can also be used as a safety marker, for example, in the event of automobile breakdowns at night, that can be held either by hand, placed on the ground or on the vehicle.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

I claim:

1. An elastic packing or support device comprising:
   at least one elastic element comprising two opposite surfaces, said two surfaces being mobile with respect to each other, composed of a rigid or semi-rigid material;
   elastic repulsion mechanisms connected to said two surfaces for allowing them to move elastically together or apart, said elastic repulsion mechanisms being provided in a space between said two surfaces; and
   mechanical guide means provided between said two surfaces to prevent any substantial relative lateral movement thereof, said guide mechanisms being composed of a group of at least two guide components disposed substantially orthogonally with respect to one another, each of said components being composed of at least two rigid plates that are hinged together on a common side and are each respectively hinged to one of the two aforementioned opposite surfaces by their side respectively parallel and opposite the common hinge side interconnecting said two plates.

2. The elastic packing or support device according to claim 1, further comprising shock absorption means provided in the space between said surfaces.

3. The elastic packing or support device according to claim 2, wherein said guide components and said shock absorption means are designed to limit a maximum distance separating said surfaces.

4. The elastic packing or support device according to claim 1, wherein said guide components are designed to limit the maximum distance separating said surfaces.

5. The device according to claim 1, further comprising prestressing mechanisms that can limit the distance separating said surfaces to a level under a maximum value.

6. The device according to claim 1, further comprising hinges for the two rigid plates that constitute each guide component and wherein said hinges are spring hinges.

7. The device according to claim 1, wherein at least one elastic element is formed to be used as padding, said element being at least partially surrounded by a cover at least partially made of skid-resistent material.

8. The device according to claim 7, at least partially covered with a fluorescent material.

9. The device according to claim 7, further comprising means to connect at least two of said at least one elements together.

10. The device according to claim 7, further comprising at least one additional elastic element, said elastic elements being connected together to make up a carpet or mattress.

11. The device according to claim 1, wherein said two surfaces of said element are covered with a skid-resistent material.

12. An elastic packing element for packaging an item comprising the device according to claim 1, further comprising a cover at least partially surrounding said element made of a skid-resistent material.

13. The element according to claim 12, wherein said cover is also at least partially covered with a fluorescent material.

14. The element according to claim 12, further comprising means to connect at least two of said elements together.

15. An elastic packing element for packaging a carpet or mattress further comprising at least one additional device according to claim 1, further comprising means for connecting said two devices together.

* * * * *